3,261,784
PROCESS FOR ALTERING THE PROPERTIES OF HIGH MOLECULAR WEIGHT HALOGEN CONTAINING SUBSTANCES
Max Goecke, Bad Homburg vor der Hohe, Otto Schweitzer, Konigstein im Taunus, and Rudolf Nagelschmidt, Hanau am Main, Germany, assignors to Deutsche Gold- und Silber-Scheideanstalt vormals Roessler, Frankfurt am Main, Germany
No Drawing. Filed Jan. 18, 1960, Ser. No. 2,855
Claims priority, application Germany, Jan. 23, 1959, D 29,832
15 Claims. (Cl. 260—2.5)

The present invention relates to a novel process which renders it possible to alter the properties, especially the mechanical properties, of high molecular weight halogen, especially chlorine containing substances.

It is, for example, known that shaped bodies, such as foils, tubes, filaments, artificial leather and the like, having good mechanical properties and chemical stability can be produced from thermoplastic polyvinyl compounds, such as polyvinyl chloride, polyvinyl acetate, polyvinylidene chloride and the like. However, if previously generally has not been possible to impart rubber-like elastic properties to such shaped bodies.

It is furthermore known that cross-linking of highly polymeric substances will in general cause changes in their properties. For example, plastic, natural or synthetic rubbers can be converted to rubber elastic products by cross-linking their molecule chains with sulfur or sulfur yielding substances. Similar cross-linkings are also known in amino- and phenoplasts. In such instances, chemical reactions take place between the molecule chains, which in some cases can proceed with the liberation of water. Usually elastic resins are obtained thereby, but non-elastic resins may also be produced. Cross-linking can also occur by the action of active substances, such as isocyanates or long chained molecules.

It also has been proposed to change the mechanical properties of polyvinyl compounds by treatment with elemental sulfur or with an organic sulfur compound and with a vulcanization accelerator. In this connection, amines, preferably di- or polyamines, reaction products of aldehydes or ketones with di- or polyamines, as well as reaction products of nitroso compounds with compounds such as acetyl acetone which contain at least one active hydrogen atom or an active methylene group, come into consideration as vulcanization accelerators.

It furthermore has been proposed to employ vulcanization accelerators of the type indicated above alone without sulfur or organic sulfur compounds for altering the mechanical properties of polyvinyl compounds.

According to the invention it was unexpectedly found that the properties of halogen containing high molecular weight compounds can be altered by treatment with N,N'-dimethylol compounds. Evidently such treatment effects a cross-linking which imparts rubber elastic properties to such compounds or improves their rubber elastic properties. In addition, such treatment generally improves their mechanical strength. Furthermore, such treatment produces a stabilizing effect and particularly the heat resistance and resistance to light of the treated composition is improved. The discoloration of the treated compositions is repressed and their good mechanical properties are maintained on weathering. The treatment according to the invention in addition improves the bond of the high molecular weight substances to natural or synthetic fibers, particularly cotton and polyamide (nylon) fibers.

Chlorine containing high molecular weight compounds, such as chlorinated rubber, hydrochlorinated rubber, polyvinylidene chloride, chlorosulfonated polypropylene, polyvinyl chloride, polychlorobutadiene and chlorosulfonated polyethylene, preferably are employed as the halogen containing high molecular weight compounds treated according to the invention, the best results being obtained with the last three mentioned. The substances indicated can be employed by themselves or also in the form of their copolymers with other suited unsaturated compounds. In addition, the treatment of polymerizate mixtures is of advantage in many instances.

Among the N,N'-dimethylol compounds which can be employed according to the invention for the treatment of the high molecular weight halogen containing substances, it was found that those which are derived from diamines, dicarboxylic diamides, urea, alkyl diurea or their derivatives produce particularly good effects.

The group of N,N'-dimethylol compounds derived from diamines can be derived from aliphatic, aromatic or cycloaliphatic diamines. Examples of this group, for instance, are: N,N'-dimethylol piperazine, N,N'-dimethylol diethyl hexamethylene diamine and all compounds of the general formula (I) 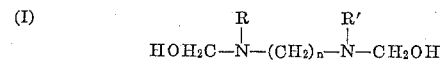

in which R and R' can be the same or different and signify hydrogen, aliphatic, aromatic, araliphatic, cycloaliphatic or heterocyclic radicals, and $n$ is a number preferably between 0 and 18. When $n=0$, N,N'-dimethylol derivatives of hydrazine or its derivatives are concerned.

The group of N,N'-dimethylol compounds derived from dicarboxylic acid diamides correspond to the general formula (II) 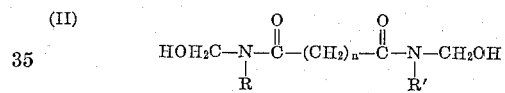

in which R, R' and $n$ have the same significance as in Formula I. Examples of this type of compound, for instance, are N,N'-sebacic acid dimethylol diamide and N,N'-adipic acid dimethylol diamide and the like.

The group of N,N'-dimethylol compounds derived from urea, thiourea or their derivatives correspond to the general formula:

(III) 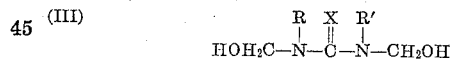

in which R and R' have the same significance as in Formula I and X is O or S. In addition, R and R' can be closed to a ring as in N,N'-dimethylol ethylene urea and such ring may also contain hetero atoms.

The group of N,N'-dimethylol compounds derived from alkyl diurea and their derivatives correspond to the general formula (IV) 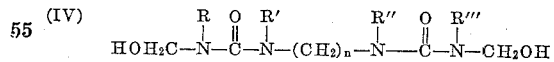

in which R, R', R", and R'" have the same significance as R and R' in Formula III. They also can be closed to a ring. $n$ signifies a number between 1 and 8.

It was also found that N,N'-dimethylol compounds derived from triamines could also be employed according to the invention with good success. Such compounds correspond to the general formula (V) 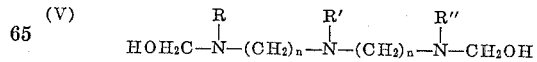

in which R, R' and R" have the same significance as in Formula IV and $n$ is a number, preferably 2 to 8.

The quantity of N,N'-dimethylol compounds employed according to the invention can be between 0.01 and 10% by weight, preferably between 0.5 and 4% by weight, with reference to the high molecular weight compound. By altering the quantity and type of dimethylol compound, the mechanical properties of the products can be altered materially and in fact every transition between rubber elastic to hard or leather-like products is possible.

It was furthermore found that the variations possible could be extended and improved still further when the N,N'-dimethylol compounds according to the invention are employed in conjunction with sulfur or sulfur yielding compounds and/or other known cross-linking agents. In this way it, for example, is possible to produce polymeric products having rubber elastic properties with a very high modulus and therefore possess the properties of very snappy vulcanizates. Especially good results are obtained when the N,N'-dimethylol compounds are employed in conjunction with the combination of compounds described in U.S. patent application Serial No. 830,735, filed July 31, 1959, that is, sulfur or organic sulfur compounds in combination with vulcanization accelerators, such as amines, preferably di- or polyamines, or these reaction products with ketones or aldehydes or reaction products of nitroso compounds with substances containing at least one active hydrogen atom or an active methylene group. It was also found advantageous to employ the N,N'-dimethylol compounds in conjunction with the compounds described in U.S. patent application Serial No. 830,726, filed July 31, 1959, namely, the reaction products of amines with ketones or aldehydes or the reaction products of nitroso compounds with substances containing at least one active hydrogen atom or an active methylene group.

It was found advantageous also to add fillers and/or dyes, and/or pigments and/or plasticizers and/or stabilizers to the high molecular weight halogen containing substances.

The fillers can be added in quantities of 1 to 150%, preferably 10 to 75%, by weight based upon the high molecular weight substance. All types of carbon black, such as flame black, coloring black and gas black, can be used as fillers. Especially good results are obtained with highly disperse and/or after-treated carbon blacks, such as oxidized carbon blacks. The use of precipitated white fillers, such as highly disperse silica, titanium dioxide, alumina, zirconium oxide and the like, is also advantageous. In addition, finely divided chalk, mica and iron oxide can be successfully used. Preferably, however, finely divided oxides of metals and metalloids are employed which have been produced by a vapor phase oxidative or hydrolytic decomposition of volatile metal or metalloid compounds at elevated temperatures. Mixed oxides or oxide mixtures can also be used.

The addition of plasticizers can be varied within wide limits. The dyes or pigments which can be used are those which are known for processing polyvinyl chloride.

Fibrous material, such as textile fibers, asbestos, glass fibers and the like, have also been found advantageous additions to the compositions according to the invention.

The process according to the invention, for example, can be carried out by first dispersing the high molecular weight substance in a plasticizer and stirring the mixture to form a paste. The fillers and the N,N'-dimethylol compounds, employed according to the invention, as well as other additions which may be made, are then mixed into the paste in a kneader, stirrer, three roll mill or the like. The resulting mixture can then, for example, be drawn out into a foil at elevated temperatures on a calender. It is also possible to produce plates or foils from such mixtures on a plate press, or to apply such mixtures to woven fabrics with the aid of a spreading machine. When poly-chlorobutadiene is employed as the high molecular weight material, this can first be milled with the filler or other additions and then be dissolved in an organic solvent, such as, for example, a mixture of about equal parts of toluene, ethyl acetate and benzine. The N,N'-dimethylol compounds according to the invention can be added to such solution. The solution can then be employed for painting or dipping.

It is, of course, also possible to add the N,N'-dimethylol compound to the mass directly after the milling and then to process the mass further on a calender or by extrusion.

As a rule, it is preferable to carry out the process as a two step procedure in which the cross-linking is only effected, for example, at temperatures over 80° C., after the masses have been shaped. The time required for the cross-linking depends upon the temperature employed and at sufficiently high temperatures only a very short time, for example, a few minutes, is required. Preferably the curing to effect cross-linking is carried out between 100° C. and 180° C. In many cases also temperatures of about 80° C. and even room temperature can be employed.

It is, however, also possible, though less desirable, to treat finished shaped bodies with solutions of the N,N'-dimethylol compounds by dipping or spraying. After such treatment the bodies must be heated to the cross-linking temperature.

The high molecular weight substances which have been treated according to the invention can also be used to produce elastic foamed products according to known methods with the aid of known blowing agents.

The following examples will serve to illustrate the invention with reference to a number of embodiments thereof. In such examples the quantities are given in parts by weight unless otherwise signified.

*Example 1*

A mass consisting of

| | Parts |
|---|---|
| Polyvinyl chloride | 70 |
| Dioctyl phthalate | 10 |
| Dicaproic acid glycol ester | 20 |
| Silica produced pyrogenically in the gas phase | 1 |
| N,N'-dimethylol piperazine | 3.5 |
| Dibutyl-tin-dilaurate | 0.2 | was drawn out to a foil on a calender and then cured at 172° C. The resulting foil possessed a high elasticity and excellent heat resistance.

The tearing strength and extension of this foil are compared in the following table with those of a foil of the same composition except that the N,N'-dimethylol piperazine was omitted.

| | Foil of above composition | Foil omitting N,N-dimethylol piperazine |
|---|---|---|
| Tearing strength, kg./cm.² | 123 | 108 |
| Extension in percent | 240 | 198 |

The elasticity according to Shob, measured over a temperature range of −40° C. to +80° C. gave the following values in percent:

| ° C. | −40 | −20 | 0 | +20 | +40 | +60 | +80 |
|---|---|---|---|---|---|---|---|
| Foil of above composition | 36.0 | 26.5 | 16.1 | 22.0 | 31.5 | 32.5 | 40.0 |
| Foil omitting N,N'-dimethylol piperazine | ¹29.5 | 26.0 | 15.0 | 11.5 | 22.4 | 26.0 | 31.0 |

¹ Several test strips ruptured.

*Example 2*

A mass of the following composition was extruded to profiled elements with a temperature rise from 155 to 170° C.

| | Parts |
|---|---|
| Polyvinyl chloride | 54.2 |
| Dioctyl phthalate | 35.6 |
| Silica produced pyrogenically in the gas phase | 1.0 |
| Active carbon black | 0.1 |
| Titanium dioxide | 4.0 |
| Chalk | 4.0 |
| Paraffin | 0.4 |
| N,N'-sebacic acid-dimethylol-diamide (M.P. 152–156° C.) | 1.0 |
| Schiffs' base from benzaldehyde and hexamethylene-diamine | 1.0 |
| Cadmium-barium-laurate | 0.2 |

The profiled elements possessed a higher stability and strength on storage at higher temperatures. The following values were measured:

| | Mass of above composition | Mass omitting N,N'-sebacic acid-dimethylol diamide and Schiffs' base |
|---|---|---|
| Tearing strength, Kg./cm.$^2$ | 112 | 94 |
| Extension in percent | 468 | 310 |

| | At 60° C. | At 80° C. | At 60° C. | At 80° C. |
|---|---|---|---|---|
| Heat stability under 200 g. load lengthening of strip after 24 hours in percent | 2 | 7 | 6 | 15 |

*Example 3*

A mass of the following composition:

| | Parts |
|---|---|
| Poly-2-chlorobutadiene | 100.0 |
| Active carbon black | 30.0 |
| Active zinc oxide | 6.0 |
| Magnesium oxide | 4.0 |
| Benzine-naphthenic oil (viscosity about 20 cst./50° C.; aniline point about 60° C.) | 4.0 |
| Sulfur | 0.8 |
| Thiuram disulfide | 0.5 |
| Dimethylol piperazine | 0.2 |
| Sym.-dimethylol-N,N'-tetraethylethylene dithiourea | 0.8 |
| Schiffs' base from acetophenone and ethylene diamine | 0.3 | was prepared by first masticating the fillers and the plasticizer into the poly-2-chlorobutadiene in the normal manner until a bound effect was achieved. Then the sulfur was added and finally the cross-linking agents were added while providing very good coating of the rolls. After completion of the mastication the mass was calendered onto a polyamide woven fabric as a thin coating. The calendering can be effected on both sides of the fabric.

The following values were obtained:

| | Mass according to Example | Mass omitting N,N'-dimethylol piperazine, thiourea derivative and Schiffs' base |
|---|---|---|
| Tearing strength, kg./cm.$^2$ | 116.8 | 89.0 |
| Extension on rupture in percent | 365 | [1] 410 |
| Bond on polyamide fabric 840 den. 10/10 weave in kg./5 cm. strip | 14.2 | 3.9 |

[1] Flowed in part.

*Example 4*

A mass of the following composition was prepared

| | Parts |
|---|---|
| Chlorosulfonated polyethylene | 100.0 |
| Chalk | 60.0 |
| Titanium dioxide | 20.0 |
| Glass fibers | 10.0 |
| Magnesium oxide | 20.0 |
| N,N'-dimethylol-N,N'-butylene diamine | 0.2 |
| Sym. dimethylol-diethyl urea dissolved in 10 parts water | 2.0 |

This mass was then dissolved in a mixer in a mixture of:

| | Parts |
|---|---|
| Toluene | 30.0 |
| Methylene chloride | 20.0 |
| Ethyl acetate | 100.0 |
| Mineral spirits | 60.0 |

The resulting about 50% mass was spreadable and was applied as a first coating on woven polyamide and polyester fabrics, as well as other fabrics.

A second spreadable mass was prepared in an analogous manner except that the glass fibers were replaced by 0.8 part of silicone oil and this was applied as an overcoating on the first coating. The resulting coatings were vulcanized at 120° C. for about 4 minutes. (At 140° C. the vulcanization only required about 2 to 3 minutes.)

The resulting synthetic leather product possessed an excellent resistance against weathering. The adherence of the coatings to the fabrics, especially to synthetic fabrics such as those of polyamide and polyester fibers, was considerably higher than when coatings of the same composition but omitting the dimethylol compounds were employed.

The following bonding values were obtained:

| | Coating according to Example | Coating omitting dimethylol compounds |
|---|---|---|
| Bond on polyamide fabric in kg./5 cm. strip | 25 | 7.2 |
| Bond on polyester fabric in kg./5 cm. strip | 23.4 | 5.1 |

*Example 5*

A mixture consisting of:

| | Parts |
|---|---|
| Polyvinyl chloride | 100 |
| Dioctyl phthalate | 40 |
| Chlorinated paraffin | 60 |
| Epoxy plasticizer (commercial) | 15 |
| Stabilizer (dibutyl tin maleate) | 1.5 |
| Active carbon black | 1.8 |
| Blowing agent (benzene sulfhydrazide) | 24 |
| Reaction product of benzaldehyde and hexamethylene diamine | 1 |
| Sebacic acid N,N'-dimethylol diamide | 3.5 |
| Piperidine pentamethylene dithio carbamate | 1.5 | was foamed at a temperature of 160–190° C. by the high pressure foaming procedure.

In the following table the mechanical properties of such foamed product (a) are compared with those of a foamed product (b) of the same composition but without the additions according to the invention

| | (a) Percent | (b) Percent |
|---|---|---|
| Rebound elasticity (according to Shob) | 64 | 24 |
| Percent of original height upon loading 1 kg./cm.$^2$: | | |
| Immediately after load applied | 71 | 49 |
| 24 hours after load applied | 41.5 | 25.5 |
| 24 hours after load removed | 92 | 46 |

The same mixture could also be foamed by the low pressure process with free heating.

*Example 6*

A mixture consisting of:

| | Parts |
|---|---|
| Polyvinyl chloride | 100 |
| Dioctyl adipate | 20 |
| Dioctyl phthalate | 50 |
| Dibutyl tin maleate | 2 |
| Dye | 6 |
| Benzene sulfhydrazide | 24 |
| N,N'-diethyl-N,N'-dimethylol urea | 6.4 |
| Piperidine pentamethylene dithio carbamate | 2 | was foamed by the high pressure foaming procedure at 160–190° C.

In the following table the mechanical properties of such foamed product (a) are compared with those of a foamed product (b) of the same composition but without the additions according to the invention

| | (a) Percent | (b) Percent |
|---|---|---|
| Rebound elasticity (according to Shob) | 55 | 25 |
| Percent of original height upon loading 1 kg./cm.²: | | |
| Immediately after load applied | 62.5 | 55 |
| 24 hours after load applied | 30 | 17.5 |
| 24 hours after load removed | 79 | 45 |

The same mixture could also be foamed by the low pressure process with free heating.

*Example 7*

A pregelled foil of the following composition was placed in a mold provided with a grained surface.

| | Parts |
|---|---|
| Polyvinyl chloride | 100 |
| Dioctyl adipate | 30 |
| Dioctyl phthalate | 40 |
| Dye compatible with polyvinyl chloride | 6 |
| Ba-Ca laurate (stabilizer) | 2 |
| Reaction product of octamethylene diamine and aceto acetic acid ester | 3 |
| Dimethylol piperazine | 1 |

Instead of using a pregelled foil, an ungelled paste of the above composition could also be spread in such mold and pregelled therein.

A plastisol of the following composition was spread over the pregelled foil in such mold.

| | Parts |
|---|---|
| Polyvinyl chloride | 100 |
| Dioctyl adipate | 30 |
| Dioctyl phthalate | 40 |
| Dye | 1 |
| Ba-Ca laurate | 2 |
| Reaction product of octamethylene diamine with aceto acetic acid ester | 2 |
| Dimethylol piperazine | 1 |
| Sulfur | 0.5 |
| Blowing agent (136 l./g. gas) (as in Example 5) | 18 |

The thus prepared mold was placed into a heating cupboard at 100° C. and the temperature slowly raised to 120° C. The plastisol foamed up and when the mold was filled by the foamed plastisol it was closed and rapidly heated to 180° C. and kept 10 minutes at this temperature. The reaction had ended after this time and after cooling, the finished shaped body consisting of a light foamed body coated with a foil was removed from the mold. Depending upon the shape of the mold, it can be used as seat or side cushions or armrests and the like in automobiles.

Cushions thus produced exhibit excellent elasticity and a good bond between the foil and the foam. The elastification effected by the additions according to the invention renders it possible, by a correspondingly lower plasticizer content of the foamed body, to produce such a bond without occurrence of plasticizer migration due to unequal plasticizer distribution between the foil and foamed body which could cause tackiness in one of such parts.

*Example 8*

A mass of the following composition:

| | Parts |
|---|---|
| Polyvinyl chloride | 50 |
| Dioctyl adipate | 35 |
| Epoxy plasticizer | 5 |
| Mica meal | 2 |
| Finely divided silica produced in the gas phase | 1 |
| Pigment | 3 |
| Paraffin | 1 |
| Dibutyl tin maleate | 1 |
| N,N'-dimethyl, N,N'-dimethylol hexamethylene diamine | 2 | was mixed and extruded at 160–165° C. to produce profiled window weather stripping. The weather stripping was of middle hardness and possessed good stability. It possessed the properties of an elastomer despite the fact that a plastomer was used therein.

*Example 9*

A mass (A) consisting of a mixture of:

| | Parts |
|---|---|
| Polyvinyl chloride produced by the emulsion process | 56.5 |
| Dioctyl phthalate | 50.5 |
| Silica produced pyrogenically in the gas phase | 2.2 |
| Dye | 2.5 |
| Dibutyl tin maleate | 1.5 |
| N - methyl-N'-phenyl-N,N'-dimethylol decamethylene diamine | 1.1 |
| N - methylol-N'-ethylene-(N''-methylol amino)-piperazine | 0.4 |
| Barium sulfate | 100 | was distributed in a compression mold in a layer 2 mm. thick and then preheated for 10 minutes in a heating cupboard.

Thereafter a mass (B) consisting of a mixture of:

| | Parts |
|---|---|
| Polyvinyl chloride prepared by the suspension process | 56.5 |
| Dioctyl phthalate | 50.5 |
| Pyrogenic silica produced in the gas phase especially fine particled | 2.2 |
| Pigment (quantity varied with covering power of pigment) | 2.8–3.5 |
| Dibutyl tin maleate | 1.5 |
| Silicone oil of a viscosity of 10.0 cst./25° C. and a flame point >200° C. at 5 mm. Hg | 0.1 |
| N - methylol-N'-ethylene - (N''-methylolamino)-piperazine | 0.65 |
| N - ethyl-N'-cyclohexyl-dimethylol urea | 2.35 |
| Hydrazine | 0.8 | was applied over the basic mass in a layer about 0.2 mm. thick. Both were then heated in the mold under a pressure of 65 kg./cm.² at 164–166° C. for 5 minutes. This caused a bonding between such masses so that separation of the layers without destruction of the material was impossible. The resulting mats exhibited good flexibility and softness and when used as floor mats adhered well to the floor.

The covering layer produced from mass B, which if desired could be profiled, possesses especially good abrasion resistance and extension values as can be seen from the following table

|  | Mass A | Mass B | Mass B without additions according to invention |
|---|---|---|---|
| Specific weight | 1.8701 | 1.3550 | 1.2958 |
| Abrasion loss in percent with Taber abrader after 5,000 m | 0.208 | 0.077 | 0.196 |
| Shore hardness | 79/76 | 82/79 | 72/68 |
| Tearing strength, kg./cm.² | 57 | 153 | 87 |
| Extension in percent | 305 | 310 | 80 |

*Example 10*

Polyvinylidene chloride threads produced in the usual manner were passed before stretching through a bath of the following composition:

|  | Parts |
|---|---|
| Water | 78.0 |
| Methanol | 10.0 |
| Propylene 1,3 - bis - (N' - methylol - N - barbituric acid)* | 11.5 |
| Dipropylene triamine | 0.5 |

\*=HOH₂C—N—CO—N—CH₂CH₂CH₂—N—CO—N—CH₂OH
         |        |                |        |
         CO—CH₂—CO              CO—CH₂—CO

The temperature of the bath did not exceed 50° C. The time in which the polyvinylidene chloride threads remained in the bath depended upon the degree of cross-linking desired. Threads with a medium degree of cross-linking in general possessed the best properties. They possessed an improved tear strength with retention of the elasticity. The heat stability of the treated threads improved about 30-60%.

Depending upon the process employed for the production of the thread an afterrinse with clear water and a subsequent short tempering treatment at temperatures up to 100° C. can be advantageous.

*Example 11*

Three or more coatings of a mixture of the following composition:

|  | Parts |
|---|---|
| Poly-2-chlorobutadiene | 32.0 |
| Zinc oxide | 1.8 |
| Magnesium oxide | 4.2 |
| Carbon black (Corax L) | 4.4 |
| Furnace black (CK3) | 7.3 |
| Graphite | 2.3 |
| Benzine-naphthenic oil | 1.4 |
| Petroleum jelly | 0.4 |
| Toluene | 15.0 |
| Xylene | 15.0 |
| Ethyl acetate | 10.0 |
| Benzine 60/95 | 10.0 |
| N,N' - mercaptoimidazole - N,N' - dimethylol-dianisidine | 2.8 | were applied to a fabric backing, the fabric being passed through a heating chamber after the application of each coating to dry such coating before application of the subsequent coating, care being taken that the drying temperature did not exceed 100–110° C. to ensure a good bond with the subsequently applied coatings. After the last coating had been applied, the coated fabric was given a final heat treatment at 140–150° C. to effect cross-linking. The resultant leather-like product had a soft but elastic hand and also had good resistance to weathering.

*Example 12*

An artificial leather such as produced in Example 11 was provided with an outer coating based on chlorosulfonated polyethylene of the following composition:

|  | Parts |
|---|---|
| Chlorosulfonated polyethylene | 36.0 |
| Magnesium oxide | 10.0 |
| Chalk | 10.0 |
| Titanium dioxide | 5.0 |
| Silicone oil of a viscosity of 5.0 cst./25° C. with a flow temperature of −65° C. according to ASTM D97 | 0.5 |
| Benzine-naphthenic oil | 0.5 |
| N,N' - mercaptoimidazole - N,N'-dimethylol-piperazine | 0.3 |
| Dipropylene - N,N',N''-trimethyl-N,N'-dimethyloltriamine | 1.4 |
| Xylene | 25.0 |
| Butyl acetate | 5.0 |
| Methyl ethyl ketone | 10.0 |
| Ethyl acetate | 12.0 |
| Benzine 60/95 | 14.0 |

Such coating was applied over the predried poly-2-chlorobutadiene based coatings but before the cross-linking heat treatment. An excellent bond was achieved between the poly-2-chlorobutadiene and the chlorosulfonated polyethylene based coatings and they could not be separated without destruction of the material. The outer coating provided a lasting white colored surface layer which also had good resistance to weathering on the artificial leather. The titanium dioxide pigment could be replaced by other pigments but in such instance the chalk would be replaced by powdered mica.

A large number of further examples similar to those above could be given with a great variety of variants. However, to provide a general view, the following is a tabulation of a number of further proven recipes.

| Substance | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|
| Polyvinylchloride | 60 | 60 | 5 |  |  |  | 65 |  |  |  |  |  | 60 |  | 70 | 100 |
| Copolymer of PVC/PVA 95:5 |  |  | 57 |  |  |  |  |  |  |  |  |  |  |  |  |  |
| Polyvinylidene chloride |  |  |  | 95 |  |  |  |  |  |  |  |  |  |  |  |  |
| Copolymer of PVC/polyvinylidene chloride 26:74 |  |  |  |  | 70 | 70 |  |  |  |  |  |  |  |  |  |  |
| Poly-2-chlorobutadiene |  |  |  |  |  |  |  |  |  | 60 |  |  |  | 68 |  |  |
| Chlorosulfon. polyethylene |  |  |  |  |  |  |  | 55 |  |  |  | 40 | 20 |  |  |  |
| Chlorinated rubber |  |  |  |  |  | 5 |  |  |  |  | 90 |  |  | 2 |  |  |
| Chlorosulfon. polypropylene |  |  |  |  |  |  |  |  |  |  |  |  |  |  |  |  |
| Mg-oxide |  |  |  |  |  | 3 | 2 | 12 | 3.1 | 6 | 62 | 30 |  |  |  |  |
| Zn-oxide | 4 | 4 |  |  |  |  |  |  | 2 |  | 4.1 | 6.2 |  | 2.8 |  |  |
| Mica |  |  |  |  |  |  | 4 |  |  |  |  |  |  | 4.5 |  |  |
| Ba-sulfate |  |  |  |  |  | 12 | 4 |  |  | 6 |  |  |  | 3 |  |  |
| Pigments | 2.8 | 2.8 |  |  |  |  | 3.3 | 8 |  | 20 |  | 5.3 | 8 | 3 | 3 |  |
| Active carbon black |  | 1.2 |  |  |  | 5 |  |  | 4.8 |  | 1.2 |  |  | 2.8 |  |  |
| Inactive carbon black |  | 1 |  |  |  |  |  |  | 6.5 |  | 0.6 |  |  | 7 |  |  |
| Graphite |  |  |  |  |  | 2 |  |  | 1.5 |  | 0.2 |  |  |  |  |  |
| Dioctyl phthalate | 10 | 10 |  |  | 8 |  | 15 |  |  |  |  |  |  |  |  |  |
| Di-2-ethyl-hexyladipate | 20 | 20 | 30 |  | 20 |  | 15 |  |  |  |  |  |  |  | 26 |  |
| Tricresylphosphate | 10 | 10 |  |  |  | 35 |  |  |  | 5 |  |  |  |  | 4 |  |
| Epoxy plasticizer |  |  | 8 | 5 | 2 |  | 5 |  |  | 5 |  |  | 10 |  |  |  |
| Dibenzalhexamethylene diamine |  |  |  |  |  | 2.2 |  |  | 0.3 |  |  |  | 4 | 0.5 |  |  |
| Butylene diamine |  | 1.1 |  |  |  |  |  |  |  |  |  | 0.5 |  |  |  |  |
| Cyclohexylethyl cyclohexylethylamine dithio-carbamate |  | 0.8 |  |  |  | 1 |  |  |  |  |  |  |  | 0.8 |  |  |
| N,N'-diethyl-N,N'-dimethylol octamethylene diamine | 3.2 | 0.36 |  |  |  |  |  |  |  | 3.8 |  |  |  |  |  |  |
| Adipic acid-N,N'-dimethyloldianilide |  |  |  |  |  | 0.3 |  |  |  |  |  |  |  |  |  |  |

| Substance | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|
| Terephthalic acid-N,N'-dimethylol diethyl diamide | | | 3.1 | | | | | | | | | | | 0.45 | | |
| N,N'-diphenyl-N,N'-dimethylolthiourea | | | | | | | | | | | 3.6 | | | | | |
| N-methylol-N'-phenyl-N,N'-dimethylol-decamethylene diamine | | | | | | | | | | | | | | | | 6.8 |
| N,N'-dimethyl-N,N'-dimethylolhexamethylene diamine | | | | | | | | | | | | | 2.23 | | | |
| N,N'-dimercaptoimidazole-N,N'-dimethylol-dianisidine | | | | | | | | | | | | 2.4 | 0.46 | 2.2 | | |
| N-ethyl-N'-cyclohexyl-N,N'-dimethylol-urea | | | | | | | 4.27 | | | | | | | | | |
| Propylene-1,3-bis-(N'-dimethylol N-barbituric acid) | | | | | | | | | | | | | 0.3 | | | |
| Sym.-ethylene-bis-diethyldimethylol-urea | | | | | 5.7 | | | 4.9 | | | | | | | | |
| Dipropylene-N,N',N''-trimethyl-N,N''-dimethylol triamine | | | | | | | | | | | | | 3.62 | | 4.1 | |
| Diethylene-N,N''-dimethyl-N'-phenyl-N,N''-dimethylol triamine | | | | | 7.2 | | | | | | | | | | | |
| Hydrazine | | | | | 0.1 | | | 2.1 | | | | | | | 0.9 | |
| Dibutyl-tin-dilaurate | | 1.8 | 0.3 | | 0.2 | | | | | | | | | | | 0.5 |
| Dibutyl-tin-maleate | 2.0 | | | 1.2 | 1.3 | 1.3 | 2.2 | | | | | | 2 | | 2 | 2 |
| Ba-Ca-laurate | | | 2.1 | | | 0.5 | | | | | | | | 0.4 | | 0.6 |
| Pyrogenic silica | 1.2 | | | | | | 0.9 | | | | | | | 1 | | |
| Sulfur | | 0.5 | | | 0.3 | | | | | | | | 1 | | 3 | |
| Benzine-naphthenic oil | | | | | | | | 0.8 | 0.9 | | 1.4 | 1.5 | | | | |
| UV-Absorber, 2,4-hydroxybenzophenone | 0.1 | | 0.1 | 0.15 | 0.15 | | | | | | | | 0.2 | | | 0.3 |

We claim:

1. A process for altering the properties of organic high molecular weight polymeric substances, the molecules of which uninterrupted possess carbon chains which predominantly are linear and which carry chlorine atoms directly on carbon atoms of such linear chains, which comprises heating such polymeric substances in contact with 0.01–10% by weight based on the polymeric substances of a monomeric N,N'-dimethylol compound of a polyamine selected from the group consisting of primary and secondary alkylene-, aralkylene-, arylene-, alkyl arylpolyamines and such primary and secondary polyamines which are amino substituted alkylene-, arylene-, aralkylene-, alkylarylene-hydrocarbons carrying at least one further substituent on such hydrocarbon radical selected from the group consisting of oxalkyl groups, hydroxyl groups and heterocyclic groups at a temperature of at least about 80° C. to effect cross-linking of said polymeric substances with said N,N'-dimethylol compound as cross-linking agent.

2. In a process for the production of foamed products from a composition containing an organic high molecular weight polymeric substance, the molecules of which possess uninterrupted carbon chains which predominantly are linear and which carry chlorine atoms directly on carbon atoms of such linear chains, the steps of incorporating with such composition prior to foaming 0.01–10% by weight based upon the polymeric substance of a monomeric N,N'-dimethylol compound of a polyamine selected from the group consisting of primary and secondary alkylene-, aralkylene-, arylene-, alkyl aryl-polyamines and such primary and secondary polyamines which are amino substituted alkylene-, arylene-, aralkylene-alkylarylene-hydrocarbons carrying at least one further substituent on such hydrocarbon radical selected from the group consisting of oxalkyl groups, hydroxyl groups and heterocyclic groups, foaming such composition in the presence of such N,N'-dimethylol compound and a foaming agent and heating the foamed product to a temperature of at least about 80° C. to effect cross-linking of said polymeric substance with said N,N'-dimethylol compound as cross-linking agent.

3. The cross-linked product of claim 1.

4. The process of claim 1 in which the quantity of N,N'-dimethylol compound employed is 0.5–4%, by weight based upon the high molecular weight chlorine containing substance.

5. The process of claim 1 in which said high molecular weight chlorine containing substances are heated with the N,N'-dimethylol compound and another cross-linking agent.

6. The process of claim 1 in which said high molecular weight chlorine containing substances are heated with the N,N'-dimethylol compound and sulfur.

7. The process of claim 1 in which said high molecular weight chlorine containing substances are heated with the N,N'-dimethylol compound and a sulfur yielding compound which is a rubber vulcanizing agent.

8. The process according to claim 1 in which said high molecular weight organic substance is heated in admixture with a filler.

9. The process according to claim 1 in which said high molecular weight organic substance is heated in admixture with a finely divided oxide filler produced by a vapor phase reaction.

10. The process according to claim 1 in which said high molecular weight organic substance is heated in admixture with 1 to 150%, by weight of a filler and based upon the high molecular weight chlorine containing substance.

11. The process of claim 1 in which said high molecular weight halogen containing substance is polyvinyl chloride.

12. The process of claim 1 in which said high molecular weight halogen containing substance is polychlorobutadiene.

13. The process of claim 1 in which said N,N'-dimethylol compound of a polyamine is selected from the group consisting of primary and secondary alkylene polyamines.

14. The process of claim 1 in which said N,N'-dimethylol compound of a polyamine is a N,N'-dimethylol alkylene diamine in which the alkylene group contains up to 18 carbon atoms.

15. The process of claim 1 in which said N,N'-dimethylol compound of a polyamine is a N,N'-dimethylol dialkylene triamine in which the alkylene groups contain 2 to 8 carbon atoms.

References Cited by the Examiner

UNITED STATES PATENTS

| | | | |
|---|---|---|---|
| 2,339,770 | 1/1944 | D'Alelio | 260—874 |
| 2,342,785 | 2/1944 | Bock et al. | 260—853 |
| 2,384,883 | 9/1945 | Britton et al. | 260—853 |
| 2,405,008 | 7/1946 | Berry et al. | 260—853 |
| 2,414,748 | 1/1947 | Kistler | 260—854 |
| 2,511,913 | 6/1950 | Greenlee | 260—72.5 |
| 2,719,832 | 10/1955 | Craemer et al. | 260—899 |
| 2,851,735 | 9/1958 | Hogg et al. | 260—2.5 |
| 3,026,285 | 3/1962 | Hirosowa | 260—72 |
| 3,060,135 | 10/1962 | Becke et al. | 260—2.5 |
| 3,065,189 | 11/1962 | Becke et al. | 260—2.5 |

FOREIGN PATENTS 699,193  11/1953  Great Britain.

MURRAY TILLMAN, *Primary Examiner.*

ALLEN M. BOETTCHER, LEON J. BERCOVITZ, RONALD W. GRIFFIN, BERNARD S. LEON, MORTON FOELAK, *Assistant Examiners.*